(No Model.)
G. W. ROSS.
STEAM PLOW.
No. 281,140. Patented July 10, 1883.
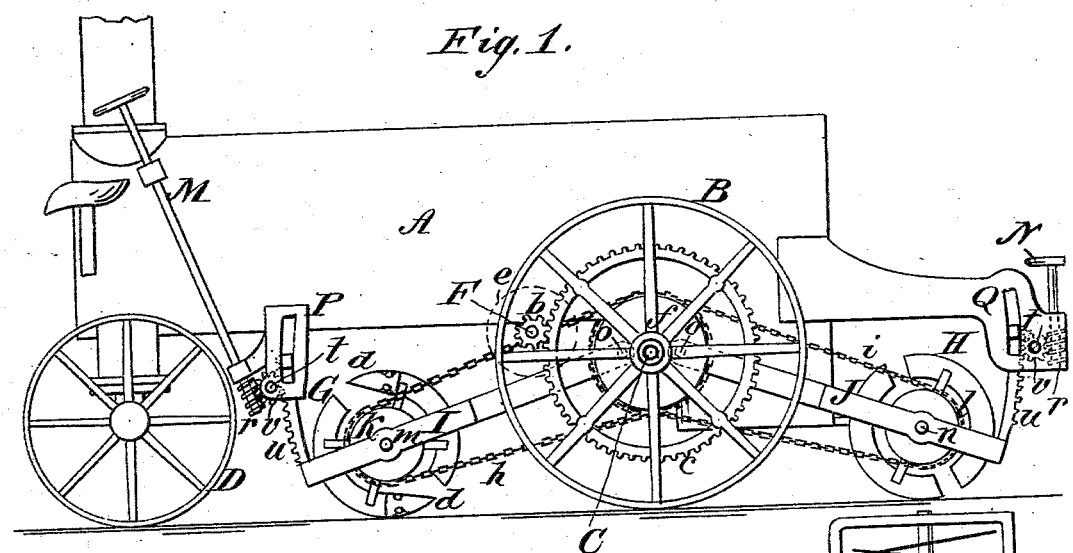
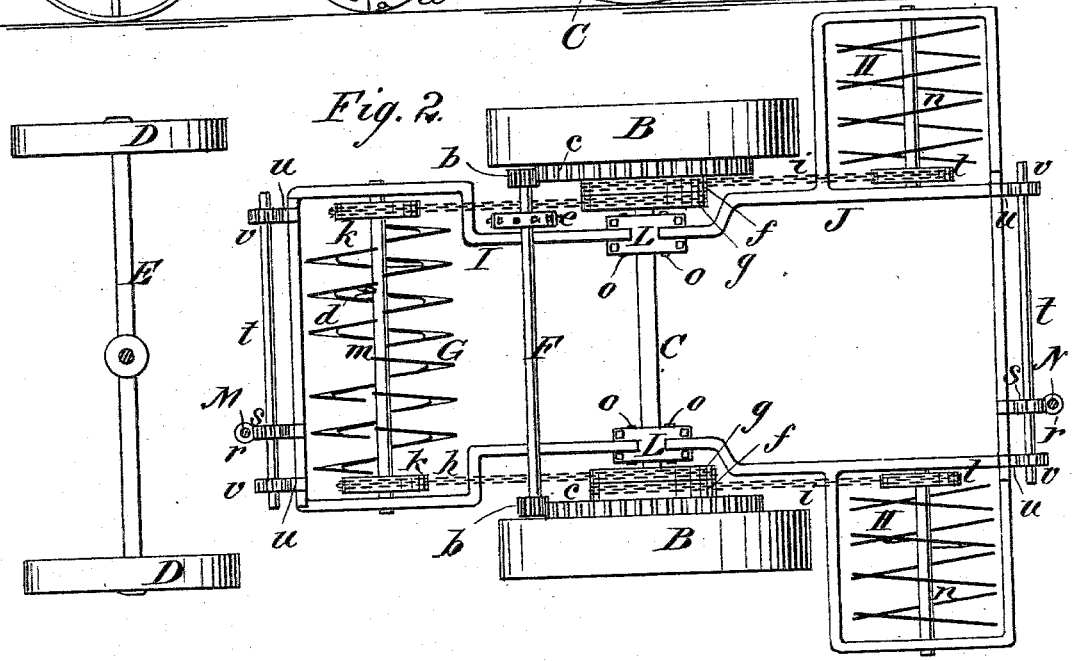
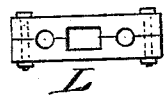
WITNESSES:
Donn Twitchell.
C. Sedgwick
INVENTOR:
G. W. Ross
BY Munn & Co
ATTORNEYS.

UNITED STATES PATENT OFFICE.

GEORGE W. ROSS, OF BLUFFDALE, ILLINOIS.

STEAM-PLOW.

SPECIFICATION forming part of Letters Patent No. 281,140, dated July 10, 1883.

Application filed March 20, 1883. (No model.)

*To all whom it may concern:*

Be it known that I, GEORGE W. ROSS, of Bluffdale, Greene county, and State of Illinois, have invented a new and useful Improvement in Steam-Plows, of which the following is a full, clear, and exact description.

This invention relates to machines for plowing purposes in which rotating screw-shaped pulverizing-blades are used; and it consists in a novel application to or combination with a roadster or traction-engine of front and rear sets of said pulverizing devices and means for operating and controlling the same. By these improvements not only the rotary pulverizing-blades are driven from the shaft which carries the running or driving wheels of the machine at a greater velocity than is due to their mere travel over the ground, but they may be driven at different velocities independently of the speed of the propelling-wheels, which, by the arrangement of the front and rear pulverizers, run on unplowed ground, and may be independently put out of action or be raised and lowered, as required; also, whereby they are not made to interfere with the use of the engine for thrashing or general purposes when it is not required for plowing; and other advantages are obtained, substantially as hereinafter described.

Reference is to be had to the accompanying drawings, forming a part of this specification, in which similar letters of reference indicate corresponding parts in all the figures.

Figure 1 represents a side elevation of a traction-engine having my invention applied. Fig. 2 is a plan view of the same in part; and Fig. 3 is a side view of one of the clips or couplings on the axle of the propelling-wheels, by which the frames of the pulverizers are connected with said axle.

A is the boiler of the engine, having its firebox in the rear.

B B are the propelling-wheels, arranged to turn loosely on a rear or main axle, C, which is stationary; and D D, the forward running wheels, arranged upon a front swiveling axle, E, by which the engine is steered.

F is the shaft by which motion is communicated from the steam-engine to the propelling-wheels B B by means of pinions $b$ $b$ on said shaft and wheels $c$ $c$ on or connected with the propelling-wheels.

G is the forward pulverizer, arranged between the front and rear wheels, D D B B, and in central relation relatively to the draft or within the lines of travel of the propelling-wheels; and H H are the rear pulverizers, arranged in rear of the propelling-wheels, and so as to follow in the wake of the tracks of said wheels and laterally beyond or outside thereof. By this arrangement of the front and rear pulverizers relatively to each other and to the propelling-wheels, said wheels run upon unplowed ground. Both sets of pulverizers G and H H rotate within their respective frames I J, and are similarly constructed of a series of screw or spiral-blade sections, with this exception, that the points $d$ $d$ of the screw-sections of the forward pulverizer, G, are made of steel and sharp or of acute form, also detachable or adjustable by means of bolts to provide for the increased wear and strain which come upon the front pulverizer, that breaks ground first. Said points or entering ends should be so arranged as to divide the time of entry to reduce strain.

The shaft F may be driven either by a chain-wheel, $e$, or gear, and is an integral part of the traction-engine, and the manner of transmitting power to it varies according to the style of engine.

Upon the axle C of the propelling-wheels are loosely fitted chain-wheels $f f$ and $g g$, which should be provided with a lever-clutch mechanism for putting them in or out of gear with the propelling-wheels B B, and which serve, by means of chains $h$ $h$ $i$ $i$ and chain-pulleys $k$ $k$ $l$ $l$ on the shafts $m$ $n$ $n$ of the screw-pulverizers G H H, to rotate said pulverizers. The chain-pulleys $k$ $k$ $l$ $l$ are of lesser diameter than the wheels $f f$ and $g g$, which drive them, whereby the pulverizers run at a higher velocity than is due to their travel over the ground, thus producing a better pulverizing action. When it is required to increase or diminish the velocity of the pulverizers without changing the speed of the propelling-wheels, smaller or larger chain-pulleys may be substituted for those on the shafts of the pulverizers, and the chains h h i i be lengthened or shortened to correspond.

Instead of driving the pulverizers by chains and pulleys, they may be driven by spur or other gearing from the rear axle, or rather propelling-wheels thereon.

The frames I J, which carry the pulverizers G H H, are pivoted, as at o o, to clips L on the axle C, in order that they may be raised or lowered to vary the depth of the pulverizers in the ground, according to the nature of the soil being worked, or to raise them from contact with the ground. When working the machine in the field, it will only be necessary to lift the front pulverizer in order to turn the machine by the steering device connected with the axle E for the purpose. When neither sets of pulverizers are required to be used, and are lifted from contact with the ground, then the pulleys or wheels which operate them should be disconnected by their clutches from the wheels c c. The frames I J may be raised or lowered by means of hand-shafts M N, in convenient position for the man at the steering-wheel in front and engineer on the platform in the rear, said shafts having screws r r on their lower ends, which work into worm-pinions s s upon shaft t t, that have their bearings, respectively, in slotted brackets or arms P Q, attached the one set to the boiler, in proximity to the wheels D D, and the other set to the fire-box in the rear. These slotted brackets act as guides to curved racks u u, secured to the outer ends of the frames I J, and struck from the same centers, o o, as said frames swing from, which racks engage with pinions v v on the shafts t t to provide for the up-and-down adjustment of the frames I J by suitably turning the hand-shafts M N.

My invention may be applied to any kind of traction-engine in which there is room for the arrangement of the necessary mechanism or devices for actuating the front and rear pulverizers, as described. By it a very much greater amount of plowing can be done in a given time than it is possible to accomplish in a machine drawn by horses, and cheaper; also, the ground will be left in such a condition that subsequent operations of harrowing and dragging will be unnecessary, and the pulverizers may be directly followed by a planter or drill, and the operation of seeding be greatly facilitated. Labor, too, will be largely economized and the rotating screw-like pulverizers will exert a propelling effect in addition to the action of the propelling-wheels themselves. The weight of the boiler and engine holds the pulverizers steady and at a uniform depth in the ground, and as the pulverizers bear a portion of the superincumbent weight, the propelling-wheels are restrained from sinking in the ground when traveling over light soils.

When it is not required to use the machine for plowing, the pulverizers may be disconnected and the engine be used for other farm-work, such as thrashing grain, sawing wood, and grinding feed. The cheapness, lightness, and simplicity of such a machine give it many advantages, and by setting the points of the blades of the pulverizers at a slightly acute angle with their axes of rotation they will be kept sharp by their friction with the ground.

Having thus described my invention, I claim as new and desire to secure by Letters Patent—

1. The combination, with the boiler A of a traction-engine, its front or steering wheels, D D, and its propelling-wheels B B, of the forward rotary screw-blade pulverizer, G, arranged between the front and propelling wheels, and between the tracks of the propelling-wheels, the rear rotary pulverizers, H H, arranged back of the propelling-wheels, laterally outside of or beyond the track of the front pulverizer, and mechanism deriving its motion from the propelling-wheels about their axle as a center, for driving the several pulverizers, essentially as described.

2. The combination, with the axle C and propelling-wheels B B, of the frames I J in pivoted connection with said axle, to admit of their up-and-down adjustment on opposite sides thereof, the rotary pulverizers G H H, carried by said frames, mechanism for driving said pulverizers from the axle of the propelling-wheels as a center, and devices for raising and lowering the frames I J of the pulverizers, substantially as specified.

3. The combination, with the boiler A of a traction-engine having its fire-box in the rear, of the slotted brackets or arms P Q, arranged in relation with the boiler as described, the shafts t t, with their pinions v v, the racks u u, the pivoted rising and lowering frames I J, and the rotary pulverizers G H H, carried by said frames, essentially as and for the purposes herein set forth.

GEORGE WHITING ROSS.

Witnesses:
ROBERT COFFIN,
A. C. KEACH.